Feb. 22, 1966  J. S. ARCUS, SR  3,236,135
ADMISSION PASS MANIPULATING MACHINE
Filed June 14, 1965  9 Sheets-Sheet 1

Fig.1.

INVENTOR.
JAMES S. ARCUS, Sr.
BY Gustav Drews
ATTORNEY

Feb. 22, 1966  J. S. ARCUS, SR  3,236,135
ADMISSION PASS MANIPULATING MACHINE
Filed June 14, 1965  9 Sheets-Sheet 4

INVENTOR.
JAMES S. ARCUS, Sr.
BY
Gustav Drews
ATTORNEY

Feb. 22, 1966  J. S. ARCUS, SR  3,236,135
ADMISSION PASS MANIPULATING MACHINE
Filed June 14, 1965  9 Sheets-Sheet 5

Fig. 7.

INVENTOR.
JAMES S. ARCUS, Sr.
BY Gustav Drews
ATTORNEY

Feb. 22, 1966   J. S. ARCUS, SR   3,236,135
ADMISSION PASS MANIPULATING MACHINE
Filed June 14, 1965                                    9 Sheets-Sheet 7

INVENTOR.
JAMES S. ARCUS, Sr.
BY
Gustav Drews
ATTORNEY

Feb. 22, 1966   J. S. ARCUS, SR   3,236,135
ADMISSION PASS MANIPULATING MACHINE
Filed June 14, 1965   9 Sheets-Sheet 8

Fig. 17.

INVENTOR.
JAMES S. ARCUS, Sr.
BY Gustav Drews
ATTORNEY

United States Patent Office 3,236,135
Patented Feb. 22, 1966

3,236,135
ADMISSION PASS MANIPULATING MACHINE
James S. Arcus, Sr., 2641 NE. 26th Terrace,
Fort Lauderdale, Fla.
Filed June 14, 1965, Ser. No. 463,526
5 Claims. (Cl. 83—364)

This invention relates to an improved admission pass manipulating machine such as disclosed in United States Letters Patent No. 2,799,337, issued July 16, 1957, Nos. 2,741,979 and 2,741,980, both issued April 17, 1956, and No. 2,949,802, issued August 23, 1960, to James S. Arcus, Sr.

As set forth in the applications for patent referred to in the entertainment field, such as sporting events, including horse racing meets, and the like, it has been conventional to issue passes to a number of groups of attendants and patrons of a race track, and the like. Record of the use of such passes for each day of each meet has been required for a number of reasons.

In the invention disclosed in Patent No. 2,741,980 it was sought to obtain the object set forth by a manually operated mechanism. With a view to simplifying that construction and materially reducing the mechanism required, the invention disclosed in Patent No. 2,741,979 provided a machine mainly relying upon electric motive power in which a ticket or pass, when received by the machine, if an acceptable ticket, at the beginning of a cycle will actuate an electric switch to establish the circuit for an electric motor, as a result of which the mechanism operatively connected with the motor will be actuated to perform the several steps of a single cycle, including the actuation of a switch lock and the eventual release of the switch lock at the end of the cycle.

In Patent No. 2,799,337, provision was made to provide a mechanism of the type illustrated in Patent No. 2,741,-979 in which (1) a single starting switch when actuated will initially establish the current to the motor of the main drive, and also to a solenoid which controls the brake shoe for a brake drum on the main drive positively to release the main drive for free actuation during a cycle; (2) the main drive when so actuated will in turn positively actuate a locking device to lock the single starting switch in circuit-establishing position and also close a second switch parallel to said starting switch, said main drive then maintaining the locking switch for said starting switch in locked position until shortly before the end of the cycle and also maintaining said second switch in closed position until after the locking mechanism for said starting switch has been positively actuated to open said starting switch; and (3) said second switch maintaining the circuit for said motor and solenoid after said starting switch has been opened to enable said main drive to continue to operate and finally liberate said second switch to enable it to open.

Due to the fact that it had been found that attempts had been made to tamper with machines of the aforesaid type, it was one of the objects of the invention disclosed in Patent No. 2,949,802 to obstruct the successful tampering with these machines. As an instance, it was found that some operators were quick enough to insert a pass and to initiate the start of the machine and withdraw the pass before the punch of the machine was able to operate upon the pass, and in turn also before the printing mechanism could cooperate with the pass to reproduce the notation on the pass.

In an endeavor to overcome this filching, one of the objects of that invention was to provide a machine which would lock the pass in the machine the moment that it is inserted and hold it so locked until the pass has been punched and a record made of the notation on the same.

More specifically, it was also an object of that invention to provide a plurality of switches for cooperation with different parts of the pass so that the authorized pass will be required to have a plurality of switch operating conformations whereby all of the switches to be closed must be closed before the machine can operate and the actuation of any one of these switches in addition to the actuation of any of the other switches will be necessary to effect the operation of the machine.

According to the present invention, the machine will not only record the number of passes used but classify them to report the number of passes used in each of the various groups for which the passes have been issued.

It is still another object of the present invention to provide a mechanism in cooperation with the adding units positively to anchor a pass when thus inserted against removal. With the mechanism shown in Patent No. 2,949,802 an attempt was made to anchor the pass against removal when once inserted before the printing and punching has taken place by means of the frictional gripping head held in place against the pass by a spring. According to the present invention, a plunger or pin is extended through a recess or opening in the pass positively to prevent the pass from being removed.

These and other features, capabilities and advantages of the invention will appear from the subjoined detailed description of one specific embodiment thereof illustrated in the accompanying drawings, in which:

Casing 1

Figure 1:
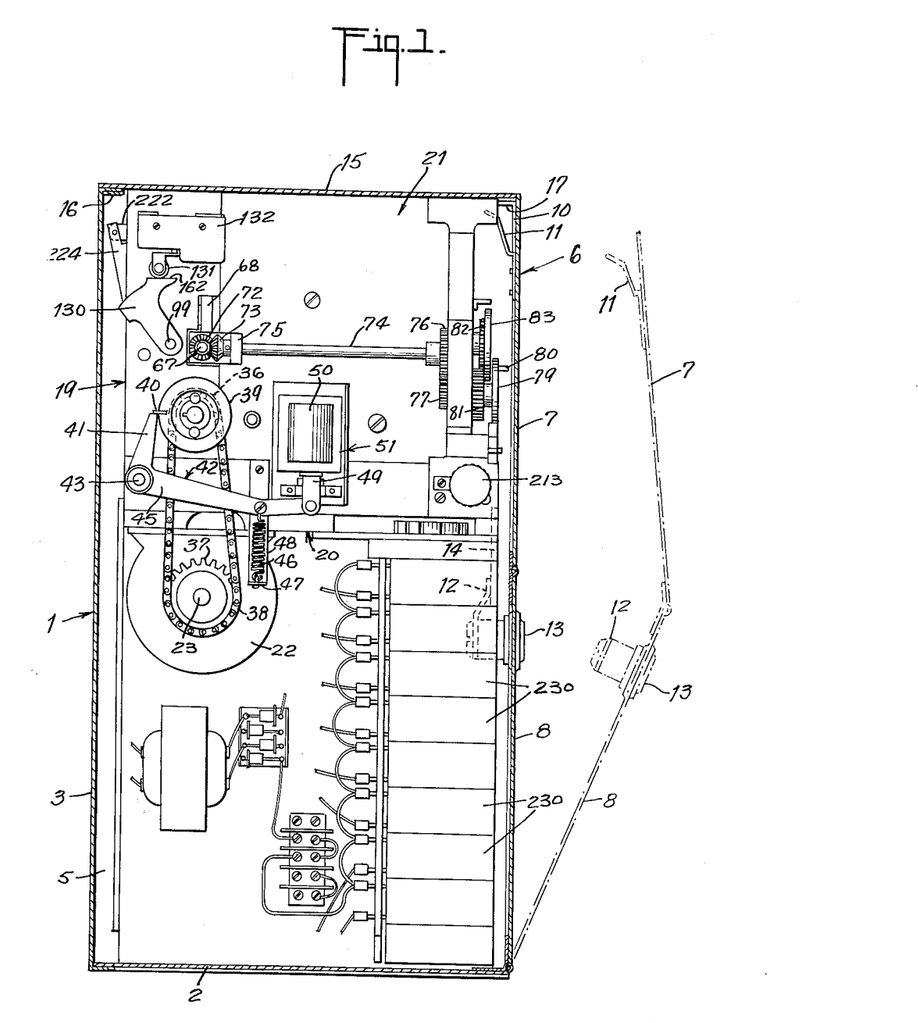
FIG. 1 is a side elevation with the case in section.
Figure 5:
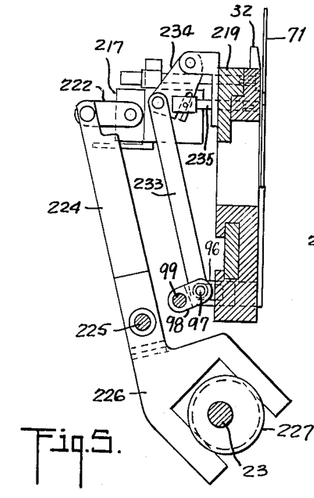
FIG. 5 is a section on line 5—5 of FIG. 3.
Figure 7:
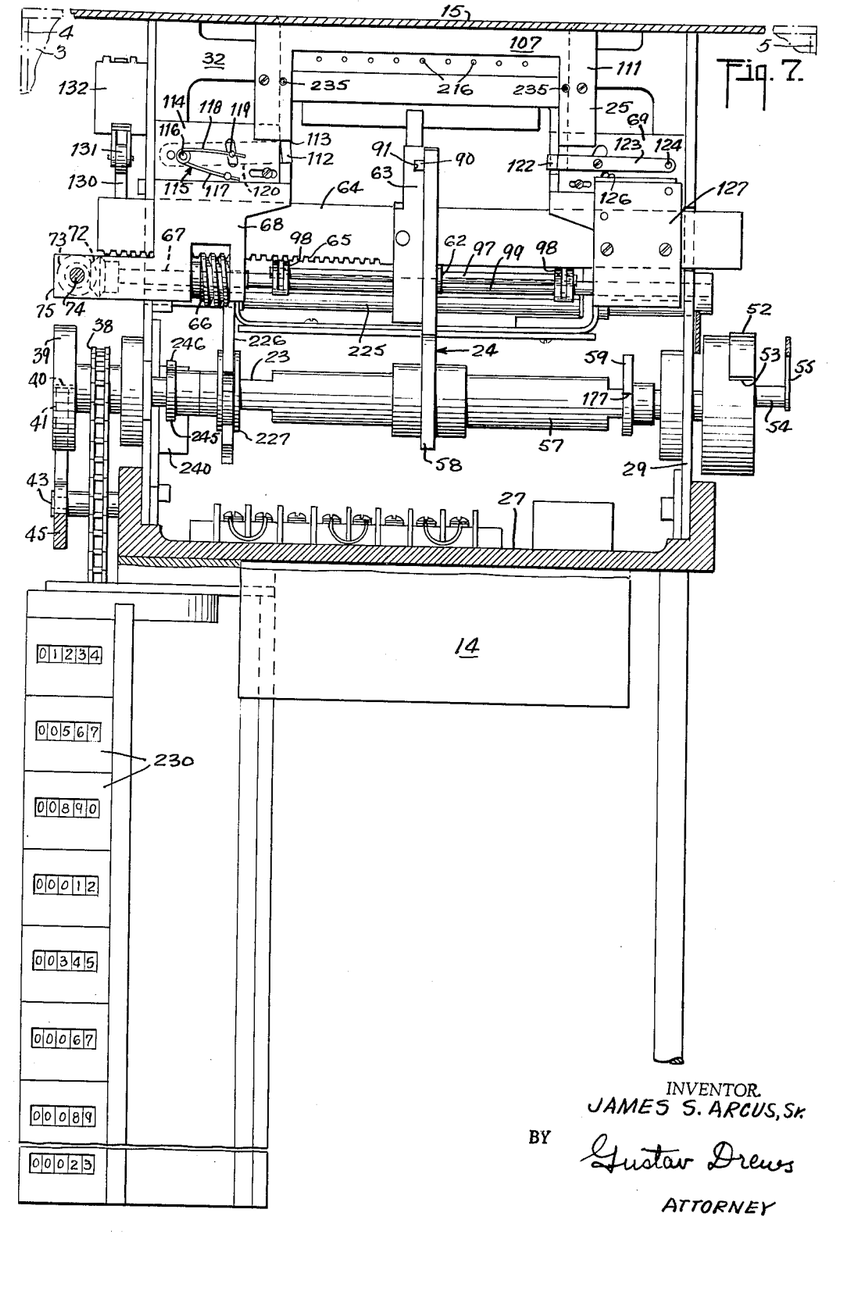
FIG. 7 is a section on line 7—7 of FIG. 2.

In the embodiment illustrated there is shown a case or casing 1 having a base 2, a rear wall 3, two side walls 4, see FIGS. 7 and 5, see FIG. 1, and a door 6 composed of two sections 7 and 8, which are pivotally connected to one another with the lower section 8 pivotally connected to the front edge of the base 2. From the upper front end of each of the walls 4 and 5 there extend toward one another the projections 10. The upper section 7 of the door 6 has fingers 11 which extend to the rear of the projections 10 when the door 6 is closed, as shown in FIG. 1, and the arm 12 of the lock 13 swings up along the rear edge of the flange 14 when the lock 13 is turned into locked position, that shown in FIG. 1.

The arm 12 clears the flange 14 in unlocked position of the lock 13, see the dotted line position of the arm 12 in FIG. 1.

The cover plate 15 is secured to the flanges 16 and 17 of the side walls 3 and 4. The frame 19 of the machine 20, now to be described, is connected to the plate 15 and hangs from the plate 15 in operative position. Consequently, in order to gain access to the working parts of the machine 20, it will be necessary to actuate the lock 13 to open the door 6. As a result of the aforesaid, tampering with the mechanism of the machine 20 will be materially reduced, if not entirely eliminated.

*Machine frames 19 and 20*

The machine 20 is composed of two main parts, one part connected to the frame 19 and the other to the frame 21. The operative parts in the frame 19 consist essentially of the motor 22, the cam shaft 23, the punch 24, and the pass receiving guide 25, while the operative parts in the frame 21 consist essentially of the printing mechanism 26.

The frame 19, see FIGS. 1, 2, 3 and 7, consists essentially of the base plate 27, the two rear cheek plates 28 and 29, and the two front uprights 30 and 31, both extending upwardly from the base plate 27. The cheek plates 28 and 29 have extending from one to the other the upper cross bar 32.

Figure 2:
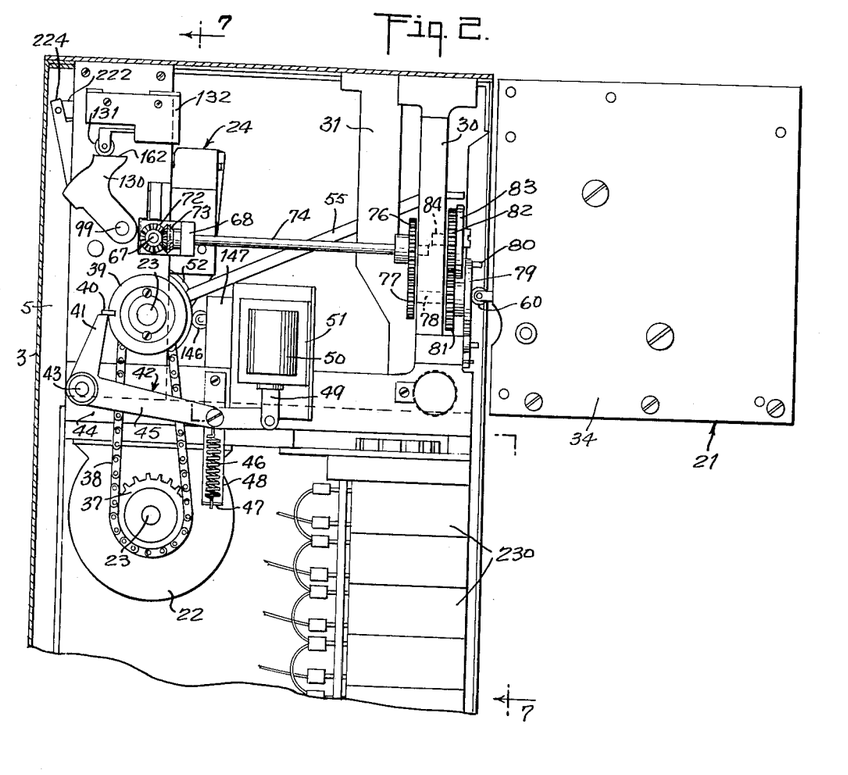
FIG. 2 is a side elevation, similar to FIG. 1, with the carriage containing the printing mechanism removed.
Figure 3:
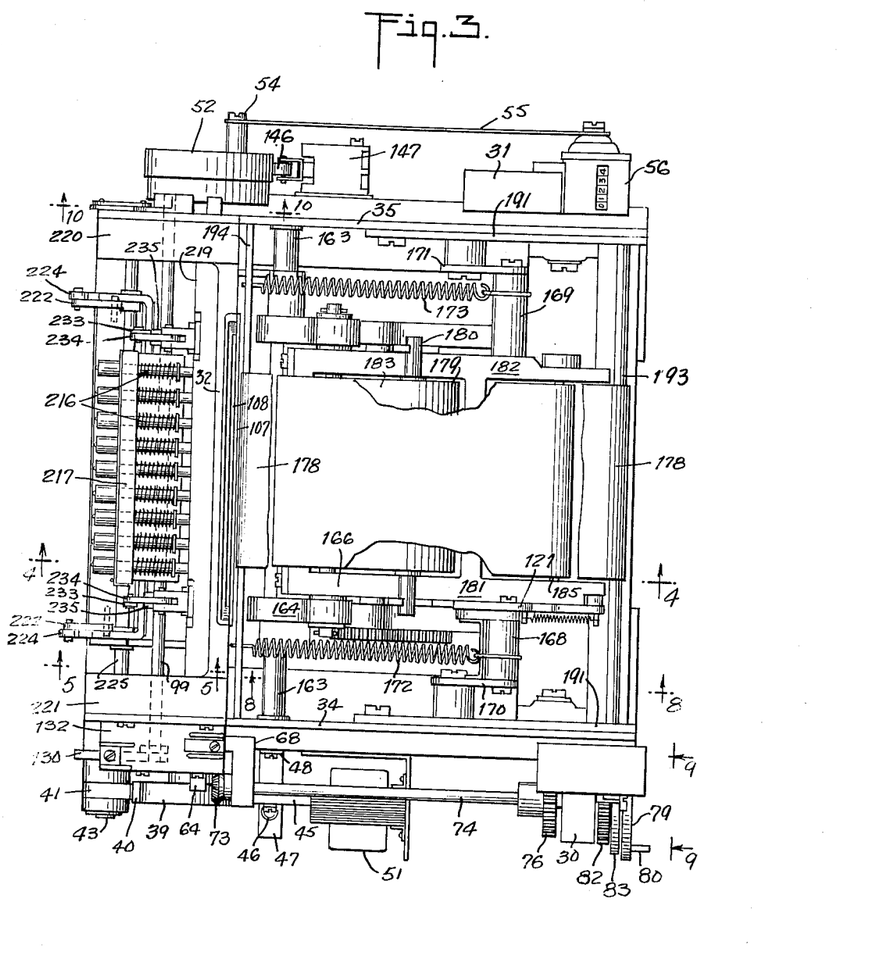
FIG. 3 is a plan view with the case and top removed but with the carriage and printing mechanism in position.
Figure 4:
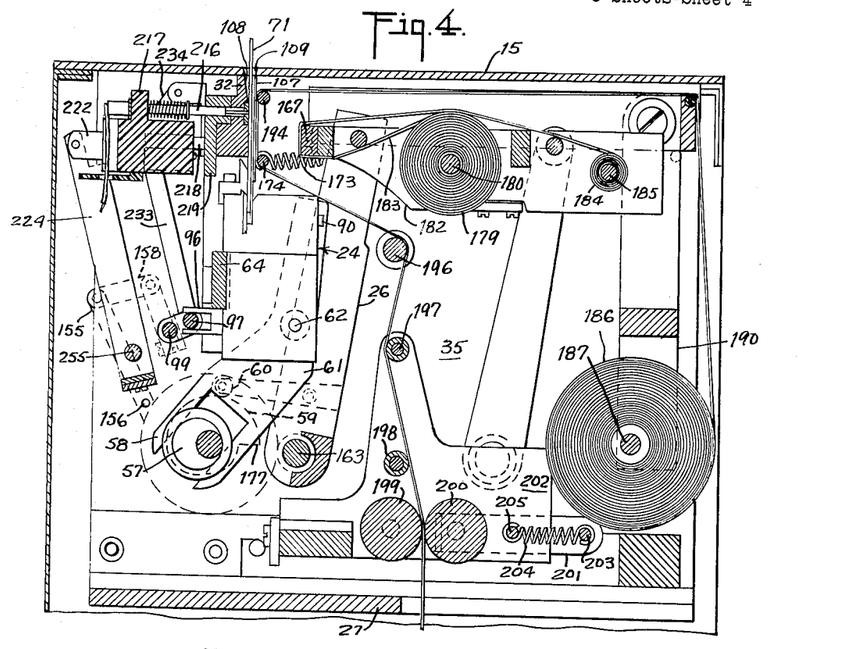
FIG. 4 is a section on line 4—4 of FIG. 3.

The frame 21, see FIGS. 2, 3 and 4, consists essentially of the rectangular base 33 and the side cheek plates 34 and 35.

*Main drive*

The main drive consists essentially of the cam shaft 23, journaled in the cheek plates 28 and 29, having between the cheek plate 28 and the side wall 4, the sprocket wheel 36 which is connected to the sprocket wheel 37 of the motor 22 by the sprocket chain 38 and the brake drum 39 which is provided with a stop 40 to cooperate with the end of the arm 41 of the bell crank 42 pivoted at 43 to the extension 44 of the base plate 27. The free end of the arm 45 of the bell crank 42 is connected by the spring 46 to the abutment 47 formed on the bracket 48, connected to the extension 44. The arm 45 is pivotally connected to the armature 49 operatively mounted in the spool 50 of the solenoid 51.

Between the cheek plate 29 and the side wall 5, see FIG. 7, on the cam shaft 23, there is mounted the drum 52 having a depressed portion 53 in its periphery and a pivot pin 54 eccentrically connected to its outer face, which pin 54 in turn is connected to the link 55 operatively connected to the counter 56 mounted on the front face of the upright 31.

Between the cheek plates 28 and 29, on the cam shaft 23, there is formed the extended eccentric cylinder 57 for receiving the claw 58 of the punch 24 and adjacent to cheek plate 29 on the cam shaft 23 there is also formed the eccentric cam disk 59 for cooperating with the cam roller 60 of the printing mechanism 26.

*Punch 24*

Figure 14:
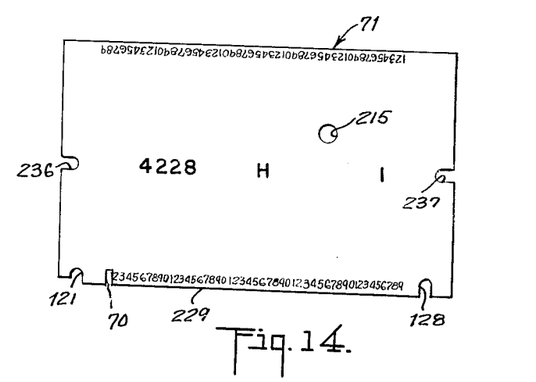
FIG. 14 is a plan view of a pass used with the present machine.
Figure 15:
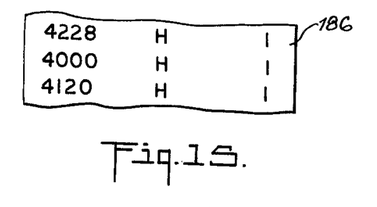
FIG. 15 is a fragmental plan view of a portion of the tape with records on the same.

The punch 24 is provided with a lever 61 which has the claw 58 aforesaid at its one end receiving the eccentric drum 57 and is pivotally connected at 62 to the bracket 63 fixedly mounted on the rack bar 64. The rack bar 64 has teeth or cogs 65 at its lower edge in mesh with the worm 66 mounted on the shaft 67 journaled in the bracket 68 whch is secured to the cheek plate 28. The rack bar 64 is slidably mounted in this bracket 68 and in the bracket 69 secured to the cheek plate 29. The rack bar 64 is positioned according to the position of the notch or recess 70 to be cut in the lower edge of a pass, such as the pass 71 illustrated in FIG. 14. In the present instance, the shaft 67 of the worm 66 has fixed thereon the beveled gear 72 in mesh with the beveled gear 73 on the shaft 74 journaled in the extension 75 of the bracket 68. The shaft 74 is also journaled in the upright 30 having fixed thereon the gear 76 in mesh with the gear 77 on the shaft 78 journaled in the upright 30. The shaft 78 has mounted thereon the disk 79, provided with a handle 80 for rotating the same. As a guide for the disk 79, its shaft 78 has fixed thereon the gear 81 in mesh with the gear 82 secured to the dial 83 which is fixed on the shaft 84 journaled in the upright 30. The dial 83, see FIG. 9, has a succession of numerals 85 on the same, thirty or more in number, to correspond to the number of positions on the pass 71 that may be notched as at 70. These numerals 85 are positioned so that one of them will register with the pointer 86 mounted on the upright 30, according to the position of the notch to be punched on the pass 71. The lever 61 of the punch 24 has an upper arm 87 provided with an elongated slot 88 in which is received the pin 89 of the male punching die 90, which is slidably mounted in the recess 91. In the bracket 63 between the pin 89 and the rear wall 92 of the recess 88, there is formed a flat spring 93 extending from one end of the slot 88. The die 90 is slidable across the slot 94 formed in the bracket 63 to receive the bar 95 fixed to the fork 96, the bifurcation of which received the bar 97 secured at its ends to the abutments 98 extending from the shaft 99 which is parallel to the bar 97.

When the bar 95 clears the slot 94 and the lever 61 is actuated for a punching operation, the male die 90 is ejected into the female die 100 to cut the notch 70 in the pass 71. When the jaw 58 is actuated to cut a notch 70, it engages the spring 93 in turn to actuate the pin 89 to advance the male die 90, the resistance of the pass 71, causing the spring 93 to be vertically held between the rear wall 92 and the pin 89 and then after the pass has yielded to the die 90 to form a cut pellet, the spring 93 will then be free further to advance the male die 90 and thereby positively eject the pellet out of the female die 100.

*Pass testing*

Before the machine can be operated, it will be necessary that the pass 71 will satisfy a predetermined code. In the present instance, the code is characterized by more than one conformation formed along various predetermined positions on the edge of the pass, which conformations will register with projections at positions corresponding to the positions of the predetermined notches or recesses. When the notches of the pass presented to the machine correspond to the position of the projections, they will close at least two actuation initiation switches which initiation switches however will immediately be de-energized or de-activated, and in place thereof a solenoid controlling switch and an auxiliary switch actuated replacing said two initiation switches.

To the crosspiece 32 there is secured a pass guide or frame 107, the mouth 108 of which registers with the opening 109 formed in the cover plate 15. The guide 107 has two extensions 110 and 111. Adjacent the extension 110 there is formed a projection 112 formed on the end of the lever 113 pivotally mounted in the extension 114 of the bracket 68, which lever 113 and projection 112 are yieldably maintained in raised position by the hairpin spring 115 wound around a pin 116 on the extension 114, with one arm 117 fixed to the extension 114 and the other arm 118 secured to the pin 119 which extends through the opening 120 in the extension 114 and is confined or controlled in its movement by said opening 120. The projection 112 is preferably disposed in alinement with the notch 121, see FIG. 7. Adjacent the lower end of the extension 111 of the frame 108, there is formed a second projection 122 at the end of the lever 123 pivotally mounted at 124 to the bracket 69. Attached to the lever 123 there is the bar normally resting on the button 126 of the switch 127, such as a micro switch. The button 126 in the conventional manner is maintained in projected position supporting the lever 123 in raised position.

For cooperation with the projection 122, the pass 71 is provided with the notch 128, the position of which is predetermined to correspond to the position of the projection 122. The projection 112 in the present instance is a dummy, located adjacent the extension 110 more or less to counterbalance the pass 71 when its other end engages the projection 122. So far as concerns its counterbalancing function, the projection 112 could of course be placed at a different level to cooperate with an intact edge of the pass 71 and not require the recess 121.

Figure 11:
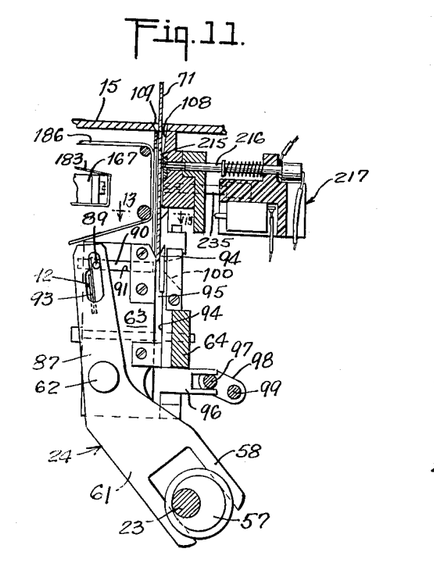
FIGS. 11 and 12 are successive positions of the punch partly in section in side elevation.
Figure 12:
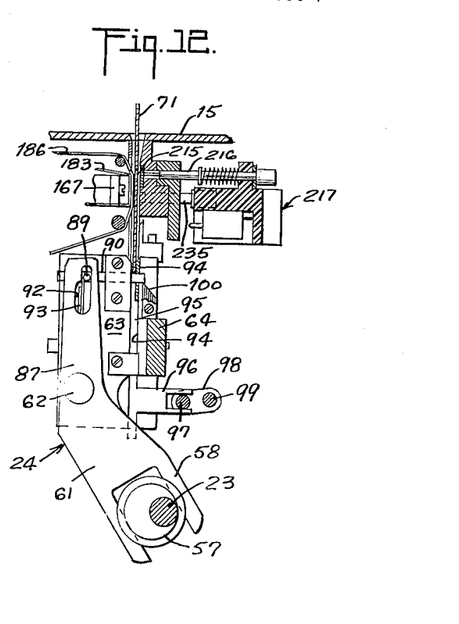
Figure 13:
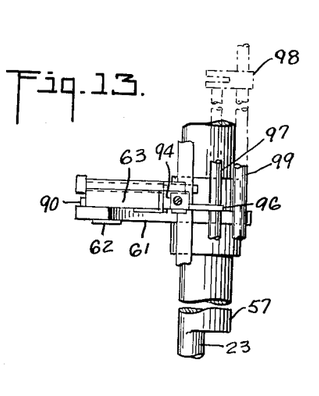
FIG. 13 is a fragmental plan showing the means for actuating the punch.
Figure 17:
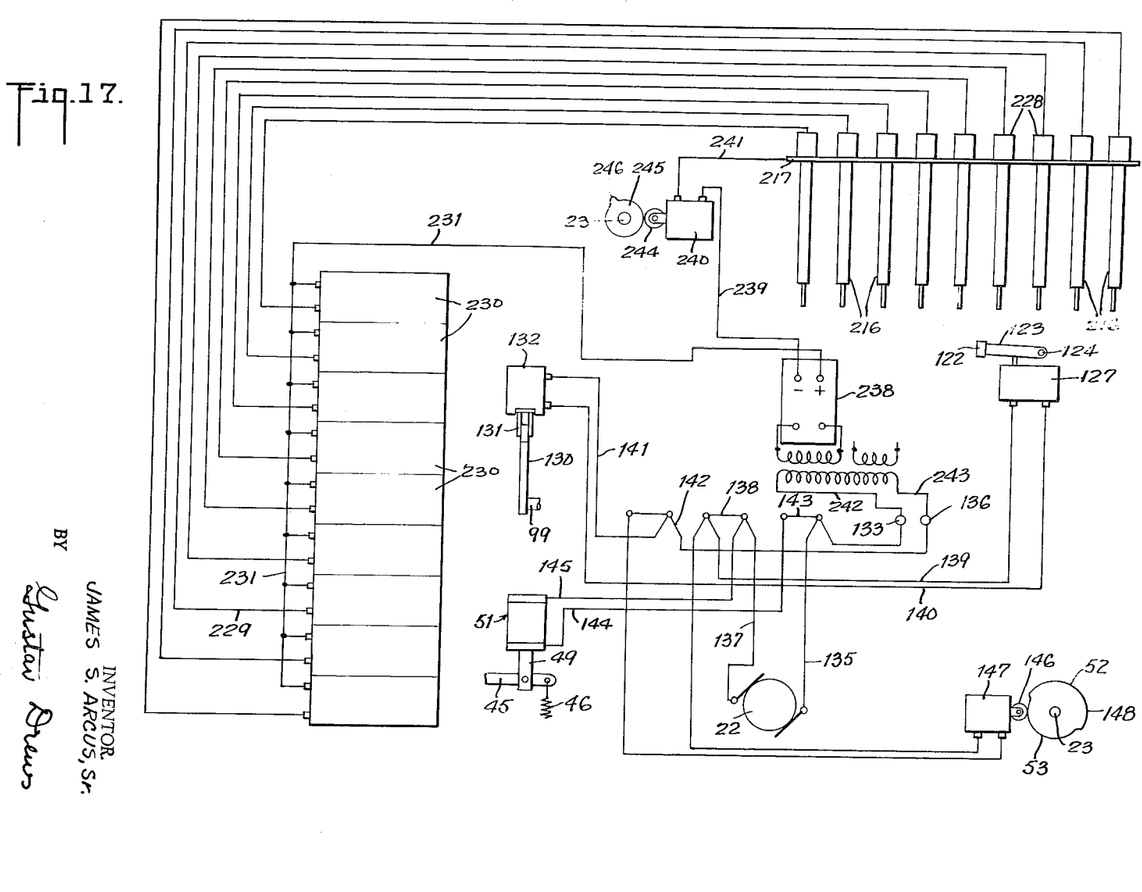
FIG. 17 is a wiring diagram of the mechanism used for the machine.
Figure 18:
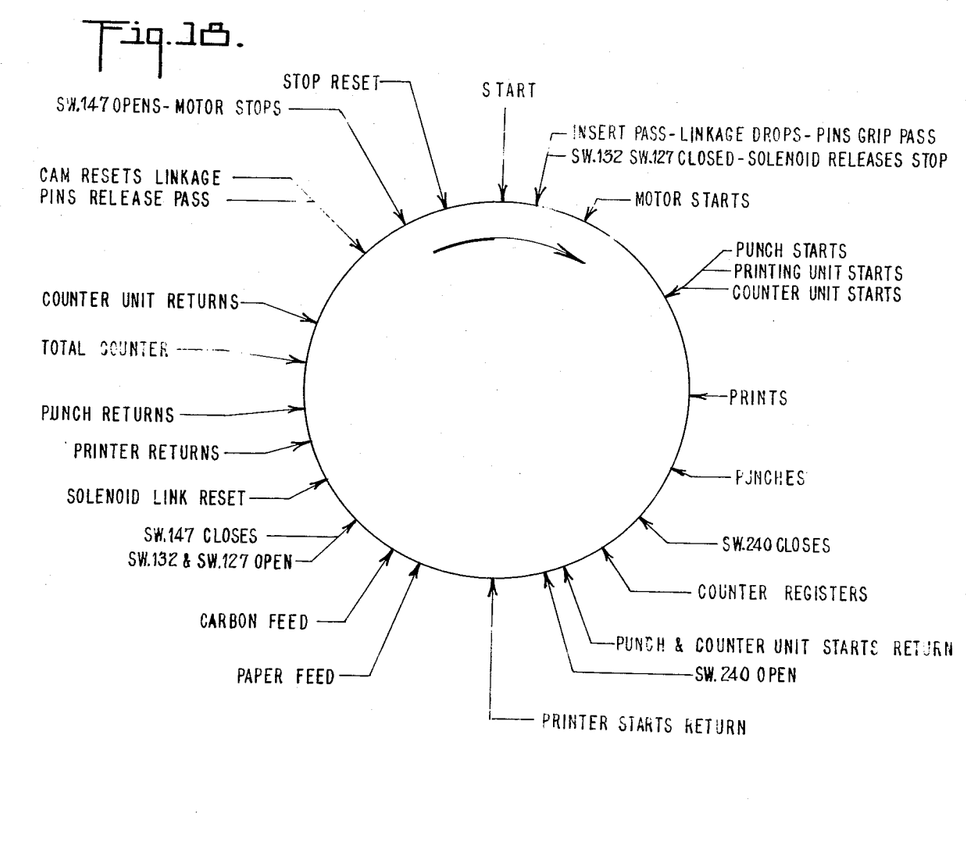
FIG. 18 is a diagram or chart showing the several operations of the machine in relation to one another.

However, to cooperate with the projection 122 to establish the current to the motor 22, see FIGS. 1, 2 and 17, the intact advance edge 129 of the pass 71 will cooperate with the projection or bar 95, FIGS. 11 and 12. In other words, if the notches 121 and 128, FIG. 14, register with the projections 112 and 122, and the advance edge 129 of the pass 71 is otherwise intact, the advance edge 129 will actuate the bars 95 and 97 to rock the shaft 99 and the portion of the pass 71 inside of the notch 128 will actuate the projection 122 to operate the switch 127. The rocking of the shaft 99 on which the lever 130 is mounted will actuate the lever 130 in turn to actuate the roller 131 of the switch 132, such as a microswitch. When both switches 127 and 132 are closed, see FIG. 17, the current will flow from one of the terminals 133 of the source of current by means of the conductors 134 and 135 to the motor 22 and to the other terminal 136 of the source of current from the motor 22, by means of the conductors 137, 138 and 139 to the switch 127, then by means of the conductor 140 to the switch 132 and then by means of the conductors 141 and 142 to the other terminal 136 of the source of current.

The moment the current is so established in the motor 22, the current will also be established in the solenoid 51, the current then passing from the terminal 133 by means of the conductors 134, 143 and 144 to the solenoid 51 and from the solenoid 51 by means of the conductors 145, 138 and 139 to the switch 127, by means of the conductor 140 to the switch 132, and by means of the conductors 141 and 142 to the other terminal 136. When the current is established in the solenoid 51, FIG. 17, its armature 49 will be attracted to actuate the bell crank 42 in turn to withdraw the arm 41 from the stop 41 and thereby liberate the cam shaft 23 to be freely actuated by the motor 22.

Immediately after the rotation of the shaft 23 is initiated, the low spot 53 in the drum 52 will clear the roller 146 of the switch 147, such as a microswitch, and the high periphery 148 of the drum 52 will engage the roller 146 and close the switch 147. The roller 146 will remain in contact with the high periphery 148 until the completion of a cycle, during which time the roller 146 so depressed will continue, not only to effect the establishment of the current in the motor 22, but also the establishment of the current in the solenoid 51, FIG. 17. As an instance, when the switch 147 is closed by engagement of the roller 146 with the high periphery 148, the current will pass from the terminal 133 of the source of current through the conductors 134 and 135 to the motor 22 and from the motor 22 through the conductors 137, 138 and 149 to the switch 147, and from the switch 147 by means of the conductors 150 and 142 to the other terminal 136 of the source of current. In turn, the currrent to the solenoid 51 will pass from the terminal 133 of the source of current by means of the conductors 134, 143 and 144 to the solenoid 51 by means of the conductors 145, 138 and 149 to the switch 147 and by means of the conductors 150 and 142 to the other terminal 136 of the source of current. Consequently, after the pass 71 has been punched by the male die 90, FIGS. 11 and 12, and the bar 97 is consequently free to rise, so far as the pass 71 is concerned, the interruption of the current by the opening of the switch 132 will not affect the rotation of the motor 22 nor the liberation of the brake drum 39.

Figures 8, 9, 10:
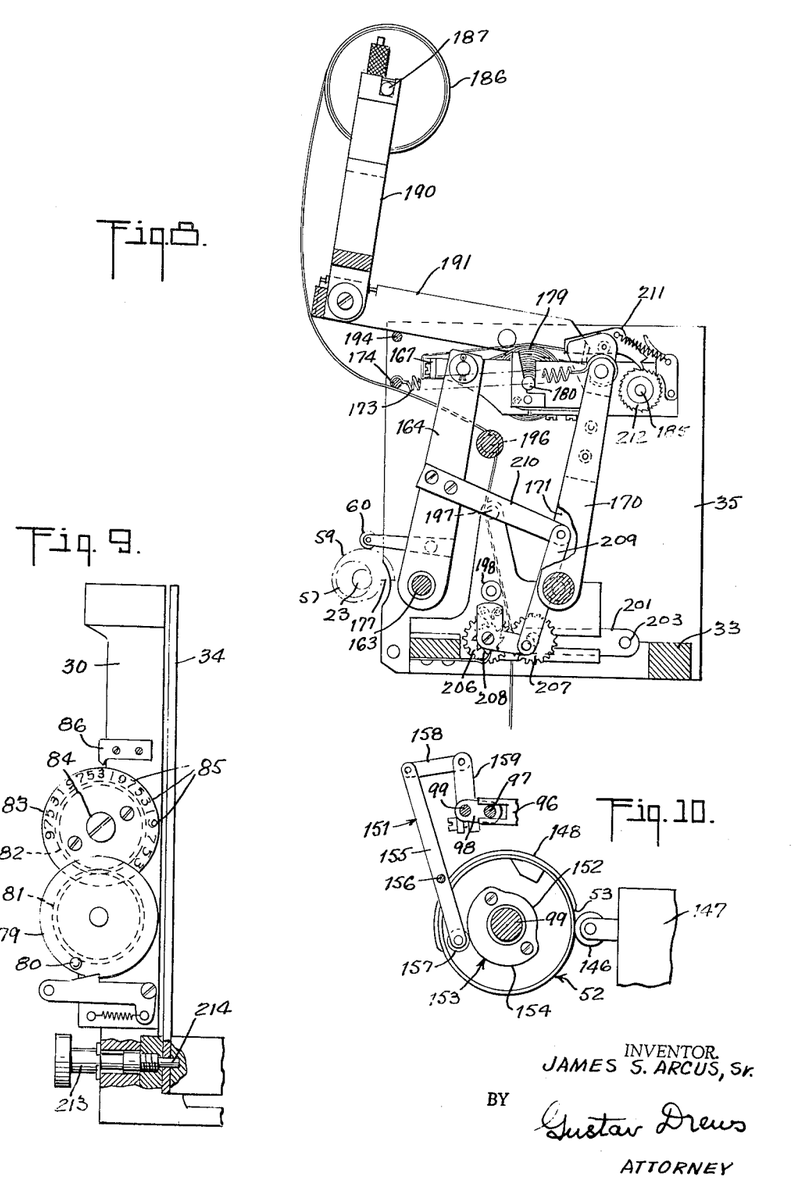
FIG. 8 is a section similar to FIG. 4.
FIG. 9 is a front elevation of the dial system for operating the rack.
FIG. 10 is a fragmental section showing the linkage for actuating the main solenoid.

As a matter of fact, the bar 97 will even then not be free to rise until the linkage 151, FIG. 10, has been actuated by the depressed portion 152 of the internal cam 153 formed in the drum 52. The depressed portion 152 is substantially coterminous with the depressed portion 53 on the outside of the drum 52 and the raised portion 154 substantially coterminous with the high periphery 148 of the drum 52. The linkage 151 is substantially identical to the corresponding linkage disclosed in United States Letters Patent No. 2,799,337, dated July 16, 1957, of the present applicant and consists essentially of a link 155 pivotally connected at 156 to the cheek plate 29. This link 155 has a roller 157 at one end in engagement with the faces 152 and 154 of the internal cam. The other end of the link 155 is pivotally connected to the link 158, which is pivotally connected to the arm 159 fixed to the shaft 99.

In view of the foregoing, so long as the roller 157 engages the raised portion 154 of the internal cam, the bar 97 will be maintained in its depressed position even though the pass 71 has been punched or notched at 70 and the portion of the pass 71 formerly in the path of movement of the bar 97 removed. The bar 97 will be so maintained in depressed position until the depressed portion 152 of the cam is brought into engagement with the roller 157 of the link 151, whereupon due to the urge of the spring 160, the linkage 151 will actuate the shaft 99 in turn to raise the bar 97 into its normal position, and at the same time also actuate the lever 130 into the position shown in FIGS. 1, 2 and 7, where the depressed portion 162 receives the roller 131 and permits the same to be deflected outwardly into circuit breaking position of the switch 132.

*Printer 26*

The printer consists essentially of a shaft 163 mounted in the cheek plates 34 and 35 of the frame 21 on which are rockably mounted the arms 164 and 165. These arms 164 and 165 are spaced from one another, see FIG. 3, and are pivotally connected at their upper ends to the platen frame 166 between them having at its rear or striking end a platen bar 167. Forwardly of the bars 164 and 165 the frame 166 has outward extensions 168 and 169 to which are pivotally connected the links 170 and 171, respectively, the lower ends of which are pivotally connected to the cheek plates 34 and 35, respectively. The extensions 168 and 169 are connected by the springs 172 and 173 to the cross rod 174 extending from one cheek plate 34 to the other cheek plate 35 at the rear end of the frame 166.

Adjacent the outer side of the arm 165 there is fixed the arm 175, having at its outer end the cam roller 60 in position to engage the cam 59 on the cam shaft 23. The cam 59 is formed to enable the cam roller 60 to drop into the depressed portion 177 after the shaft has completed about ninety degrees or one-quarter of a revolution when the springs 172 and 173 will be free to advance the platen bar 167 into printing position.

To facilitate forming an impression on the paper record sheet 178, there is provided a roll of carbon paper 179, mounted on the shaft 180, extending from one arm 181 to the other arm 182 of the platen frame 166. From the roll 179 the carbon sheet 183 passes around the platen bar 167 and over the same to the take up roll 184 mounted on the shaft 185 similarly extending from one arm 181 to the other arm 182. Adjacent the pass 71, when positioned in a guide 107, there extends the paper 178 it passing up from the supply roll 186 mounted on the shaft 187 journaled in the arms extending upwardly from the crosspiece of the frame 190, the free ends of the arms being pivotally connected to the free ends of the links 191 which are pivotally connected to the cheek plates 34 and 35, and extending from the cheek plates 34 and 35 when in operative position.

From the roll 186 the sheet of paper 178 passes around the guide rod 193 and rearwardly across the guide rod 194 and then down around the guide rod 174 to and over the rod 196 and then down in engagement with the rollers 197 and 198 between the feed rollers 199 and 200, discharging down beyond the base 27. The feed roller 200 is journaled on the ends of the bars 201, which are slidably mounted in the brackets 202. The bars 201 are connected to one another by the rod 203 which in turn are connected by the springs 204 to the rod 205 on the brackets 202 yieldably to maintain the roller in feeding engagement with the roller 199. The rollers 199 and 200 are drivingly connected to one another by the gears 206 and 207, respectively, see FIG. 8, which gears 206 and 207 are in mesh with one another and connected to the pawl and ratchet mechanism 208 drivingly connected to the link 209 which is pivotally connected to the arm 210 fixed to the arm 164. Consequently, whenever the arms 164 and 165 are returned by the operation of the cam 59 and the cam roller 60, the feed rollers 199 and 200 will be actuated to feed the paper 178 a distance predetermined corresponding to a line space to present a fresh line or surface of the paper 178 to the carbon 179 and adjacent platen bar 167.

Simultaneously with the feed of the paper 178 by the pawl and ratchet mechanism 208, the carbon paper 179 will also be fed through the cooperation of the pawl 211 with the ratchet 212 fixed to the shaft 185 of the take up roll 184 of the carbon paper 179. Preferably the feed of the carbon paper 179 per cycle is much less than the feed of the paper 178 per cycle.

To facilitate access to the carbon paper 179 and the working parts of the printing mechanism, as shown in FIG. 8, the paper roll 186 in the frame 190 with the aid of the links 191 may be swung upwardly where the links 191 rest on the tie rod 194.

When the section 21 is positioned in the section 19, where the cam roller 60 on the arm 175 engages the periphery of the cam 59, and the set screws 213 on the section 19 enter the recesses 214 and firmly grip the section 21 and the plate 15 is secured to the casing 1, the machine is ready for operation.

Figure 6:
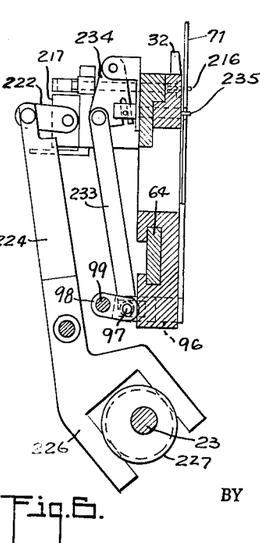
FIG. 6 is a section similar to FIG. 5 with the counter pin advanced.

With the feature so far described, with the exception of the gripping mechanism for holding the pass 71 in position while the aforesaid operations are being performed, the mechanism performing the features now to be described are added. As an instance, the passes are provided with the group designation holes such as the hole 215 on the pass 71. This hole 215 will receive one of the pins 216 illustrated in FIG. 16. These pins 216 are held out of the path of movement of the pass 71 by the bracket 217 which bracket 217, see FIGS. 4, 5 and 6, is slidably mounted on the pins 218 extending from the bracket 219 connected to the brackets 220 and 221 of the frame. The links 222 are connected to the lever 224 which is pivotally mounted on the shaft 225 and formed into the fork 226 at the lower end which engages the cam 227 mounted on the shaft 23.

In the cycle, the cam 227 actuates the lever 224 to advance the bracket 217 toward the bracket 219. Immediately that the shaft 23 is actuated in order to cause the pins 216 to engage the pass 71 and permit the pin of the pins 216 which registers with the opening 215 to enter the opening 215 of the pass 71, the lever 224 will be actuated from the position shown in FIG. 5 into the position shown in FIG. 6 when the pin so selected will enter the opening 215.

Immediately before the shaft 23 is actuated, the shaft 97 will be depressed to actuate. In turn when the shaft 97 is initially depressed by the pass 71 inserted into the machine, it will cause the link 233 to be actuated in turn to actuate the bracket 234 to which are connected the pins 235, see FIG. 6, which enter the recesses 236 and 237 of the pass 71. Since the shaft 97 will be actuated and cause the pins 235 to enter the recesses 236 and 237, it will hold the pass 71 while the pin 216 selected enters the opening 215 and the pass 71 is punched along the advance edge 129.

From the foregoing it will thus appear that the recesses 236 and 237 as well as the opening 215 cooperate with the punch 24 to anchor the pass 71 against removal until after a recess has been punched in the pass 71 adjacent the advance edge 129.

Figure 16:
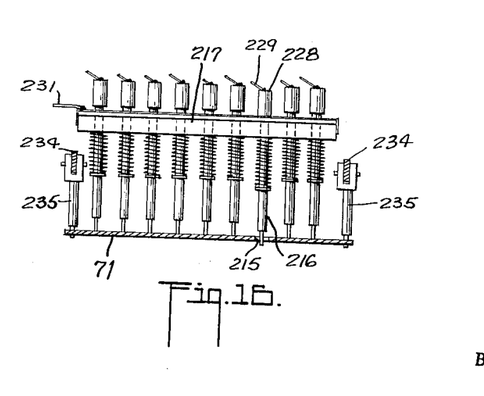
FIG. 16 is a fragmental section showing a number of the pins for controlling the counters.

The bracket 217, see FIGS. 3 and 16, contains the pins 216 and permits only that pin 216 which registers with the opening 215 in the pass 71 to pass through the bracket 217 and permit the bracket 217 to be engaged by the head 228 of the pin 216 which registered with the opening 215 in the pass 71. When the head 228 so engages the bracket 217, see the wiring diagram in FIG. 17, the conductor 229 from the head 228 so selected will establish a circuit through the counter 230 to the common return 231 which is connected to the transformer 238 which in turn is connected by the conductor 239 to the microswitch 240. This microswitch 240, in turn, is connected by the conductor 241 to the bracket 217. The transformer 238 is connected to the source of supply 133 and 136 by the conductors 242 and 243 respectively. The microswitch 240 is provided with the cam roller 244 cooperating with the cam 245 mounted on the shaft 23 which has a projection 246.

From the foregoing, it will thus be seen that the total count of all of the passes which are recorded by the total counter 56 are also counted in groups by the group counters 230, each group counter, such as the counter 230 recording only the passes which belong to its particular group.

It will also appear from the foregoing that since a group counter 230 cannot be actuated without the selected pin entering the opening 215 in the pass 71 that an actuation of a group counter 230 cannot take place and in turn an actuation of the machine not take place unless the card is first affixed by the pins 235 and 216.

I claim:

1. In an admission pass manipulating machine, the combination of an authorized pass having a leading edge, a punch forming a notch in the leading edge of said authorized pass, a plurality of group counters, each pass having an opening corresponding in position to one of said group counters, a plurality of second pins, one second pin for each of said openings and corresponding to a group counter, a frame, a drive shaft mounted in said frame, a motor operatively connected to said drive shaft, a first cam on said drive shaft operatively connected to said punch, a second cam mounted on said drive shaft and operatively connected to said second pins, means for actuating said latter drive shaft in turn to actuate said first cam in turn to actuate said punch and also actuate said second cam in turn to actuate the pin connected to the group counter registering with the opening in the authorized pass, and means for actuating the group counter with the pin selected by the opening in the pass.

2. The admission pass manipulating machine set forth in claim 1 characterized by said second pin selected by the opening in the authorized pass being actuated to enable the opening in the authorized pass to receive said second pin until the group counter associated with such second pin is actuated.

3. The admission pass manipulating machine set forth in claim 1 characterized by said second pin entering the opening in the authorized pass and remaining there until the group counter associated with such second pin has been actuated, and means for actuating said latter means to release said second pin and leave the authorized pass after a group counter has been actuated.

4. The admission pass manipulating machine set forth in claim 1 characterized by said second pin selected by the opening in the authorized pass being actuated to enable the opening in the authorized pass to receive said second pin until the group counter associated with said second pin is actuated, means including more than one holding plunger, and openings in the authorized pass corresponding to such plungers, and means associated with said drive shaft to actuate the plungers to enter the openings in the authorized pass corresponding to such plungers and hold said pass in position until the group counter associated with such plunger is actuated.

5. In an admission pass manipulating machine, the combination of an authorized pass having a leading edge, a frame, a guide mounted in said frame for receiving such pass, a main obstruction movably mounted in the path of movement of said leading edge, a second obstruction movably mounted in said frame also in the path of said leading edge, a spring pressed switch normally positioning said second movable obstruction in advanced position in the path of movement of said leading edge, a drive shaft mounted in said frame, a motor operatively connected to said drive shaft, a first cam on said drive shaft, a lever mounted on said frame, pins operatively mounted on said lever to enter said opening in said pass, a bracket mounted on said frame, a punch slidably mounted on said bracket and operatively connected to said lever, a source of current, a main switch operatively connected to said main obstruction, a first wiring connecting said source of current, switches and motor to initiate the actuation of said main drive shaft when both said obstructions are actuated to close said switches to initiate a cycle of operation and actuate said first cam to actuate said lever in turn to enable said spring to actuate said pins into penetrating engagement with said pass, a third switch, a second cam operatively connected to said drive shaft and operatively associated with said third switch, a second wiring connecting said third switch with said motor and source of current to establish a second circuit to said motor, a third cam operatively connected to said drive shaft, a linkage operatively connecting said third cam to said main obstruction, the continued actuation of said third cam during the completion of its cycle successively maintaining said main obstruction in switch closing position, in turn the continued actuation thereupon of said first cam actuating said lever in turn to actuate said punch, restore said punch, restore said pins and the continued actuation in turn of said third cam, releasing said main obstruction in turn to open said first switch and said second switch to enable said second movable obstruction to eject said pass from said guide and upon the further actuation of said second cam finally open said third switch, and a plurality of group counters, each pass having an opening corresponding in position to one of said group counters, a fourth cam operatively connected to said drive shaft, a plurality of second pins, each second pin corresponding to one of said group counters, a second lever operatively connecting said fourth cam to said second pins, the pin of said second pins registering with said one of the openings in said pass entering said one opening to enable its actuation of said second lever in turn to actuate the group counter associated with said opening.

No references cited.

WILLIAM W. DYER, JR., *Primary Examiner.*

J. M. MEISTER, *Assistant Examiner.*